US010933912B2

(12) United States Patent
Odate (10) Patent No.: US 10,933,912 B2
(45) Date of Patent: Mar. 2, 2021

(54) DRIVING SUPPORT DEVICE, DRIVING SUPPORT METHOD, AND COMPUTER READABLE STORAGE MEDIUM

(71) Applicant: HONDA MOTOR CO., LTD., Tokyo (JP)

(72) Inventor: Shotaro Odate, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 199 days.

(21) Appl. No.: 16/108,269

(22) Filed: Aug. 22, 2018

(65) Prior Publication Data

US 2019/0061811 A1 Feb. 28, 2019

(30) Foreign Application Priority Data

Aug. 25, 2017 (JP) ................................ 2017-162667

(51) Int. Cl.
*B62D 6/00* (2006.01)
*B62D 6/10* (2006.01)
(Continued)

(52) U.S. Cl.
CPC .......... *B62D 6/10* (2013.01); *B60R 21/01538* (2014.10); *B60W 30/10* (2013.01);
(Continued)

(58) Field of Classification Search
CPC ............... B60W 30/12; B60W 50/029; B60W 60/0018; B60W 60/0053; B60W 30/10;
(Continued)

(56) References Cited

U.S. PATENT DOCUMENTS 6,929,086 B1 8/2005 Husain et al.
9,079,607 B2 * 7/2015 Tanimoto ............... B62D 5/046
(Continued)

FOREIGN PATENT DOCUMENTS

CN 1827447 9/2006
CN 101959743 1/2011
(Continued)

OTHER PUBLICATIONS

A Novel Motion Plane-Based Approach to Vehicle Speed Estimation; Mahmoud Famouri;Zohreh Azimifar;Alexander Wong; IEEE Transactions on Intelligent Transportation Systems; vol. 20, Issue: 4;| IEEEJournal Article; (Year 2019).*
(Continued)

*Primary Examiner* — Cuong H Nguyen
(74) *Attorney, Agent, or Firm* — Amin, Turocy & Watson, LLP (57) ABSTRACT

A driving support device may include, but is not limited to: a plurality of sensors is configured to detect state quantities relating to steering of a vehicle; a determiner is configured to determine whether each of the plurality of sensors is normal or abnormal; and a controller controlling execution of driving support functions for supporting a driving operation for the vehicle, in which the controller is configured to determine a control state of an executable driving support function on the basis of a result of the determination of the determiner.

10 Claims, 7 Drawing Sheets

(51) Int. Cl.

| | | |
|---|---|---|
| *B62D 5/04* | (2006.01) | |
| *B60R 21/015* | (2006.01) | |
| *G08G 1/16* | (2006.01) | |
| *B60W 30/10* | (2006.01) | |
| *G06K 9/00* | (2006.01) | |
| *B62D 15/02* | (2006.01) | |
| *G06T 7/60* | (2017.01) | |
| *B60R 1/00* | (2006.01) | |
| *G06T 1/60* | (2006.01) | |
| *G01L 25/00* | (2006.01) | |

(52) U.S. Cl.
CPC .......... *B62D 5/049* (2013.01); *B62D 5/0463* (2013.01); *B62D 5/0481* (2013.01); *B62D 5/0484* (2013.01); *B62D 15/025* (2013.01); *B62D 15/0255* (2013.01); *G06K 9/00805* (2013.01); *G08G 1/167* (2013.01); *B60R 1/001* (2013.01); *G01L 25/00* (2013.01); *G06T 1/60* (2013.01); *G06T 7/60* (2013.01)

(58) Field of Classification Search
CPC ...... B60W 2050/0215; B60W 2520/10; B60R 21/01538; B60R 1/001; G08G 1/09623; G08G 1/167; G06T 1/60; G06T 7/60; G06K 9/00805; B62D 5/0484; B62D 15/0255
USPC .......................................................... 701/41
See application file for complete search history.

(56) References Cited

U.S. PATENT DOCUMENTS

| | | | | |
|---|---|---|---|---|
| 9,157,835 | B2* | 10/2015 | Kichise | ................ G01L 3/104 |
| 9,434,408 | B2* | 9/2016 | Kojo | ................ B60T 8/1755 |
| 9,772,249 | B2* | 9/2017 | Yamano | ................ H02K 11/24 |
| 10,065,674 | B2* | 9/2018 | Maeda | ................ B62D 5/0481 |
| 10,850,769 | B2* | 12/2020 | Asaka | ................ B62D 15/0215 |
| 2006/0020029 | A1 | 9/2006 | Chino et al. | |
| 2006/0200290 | A1 | 9/2006 | Chino et al. | |
| 2013/0311045 | A1* | 11/2013 | Tanimoto | ................ B62D 5/046 |
| | | | | 701/42 |
| 2015/0046039 | A1* | 2/2015 | Yamano | ................ G01L 5/221 |
| | | | | 701/41 |
| 2015/0314803 | A1* | 11/2015 | Kojo | ................ B62D 5/049 |
| | | | | 701/43 |
| 2017/0151979 | A1* | 6/2017 | Maeda | ................ B62D 5/0484 |
| 2018/0348779 | A1* | 12/2018 | Oniwa | ................ G06K 9/00798 |

FOREIGN PATENT DOCUMENTS

| | | | | | |
|---|---|---|---|---|---|
| CN | 102448798 | | 5/2012 | | |
| CN | 102826116 | | 12/2012 | | |
| CN | 104340266 | A * | 2/2015 | ............... | B62D 6/10 |
| CN | 104837704 | A * | 8/2015 | ............. | B62D 5/049 |
| DE | 112013006388 | T5 * | 9/2015 | ............ | B60W 10/18 |
| EP | 2835624 | A2 * | 2/2015 | ........... | B62D 5/0463 |
| JP | 05-301577 | | 11/1993 | | |
| JP | 06-293276 | | 10/1994 | | |
| JP | 10-329728 | | 12/1998 | | |
| JP | 2007-168720 | | 7/2007 | | |
| JP | 2009-214680 | | 9/2009 | | |
| JP | 2010-132253 | | 6/2010 | | |
| JP | 2015034737 | A * | 2/2015 | ............. | B62D 5/049 |
| JP | 2016-078490 | | 5/2016 | | |
| KR | 2000-0019287 | | 4/2000 | | |
| WO | 2014/109037 | | 7/2014 | | |
| WO | WO-2014109037 | A1 * | 7/2014 | ........ | B60W 50/0205 |

OTHER PUBLICATIONS

Control design for a high speed railway vehicle via fixed and non-fixed order optimization; Asli Soyiç Leblebici;Semiha Türkay; 2017 12th IEEE Conference on Industrial Electronics and Applications (ICIEA); IEEE Conference Paper (Year 2017).*
Real-Time Speed Trajectory Planning for Minimum Fuel Consumption of a Ground Vehicle; Junyoung Kim;Changsun Ahn; IEEE Transactions on Intelligent Transportation Systems; vol. 21, Issue: 6; IEEE Journal Article (Year 2020).*
A New Approach to Green Light Optimal Speed Advisory (GLOSA) Systems for High-Density Traffic Flowe; Hironori Suzuki; Yoshitaka Marumo; 2018 21st International Conference on Intelligent Transportation Systems (ITSC); IEEE Conference Paper ( Year 2018).*
Japanese Office Action for Japanese Patent Application No. 2017-162667 dated Jan. 8, 2019.
Japanese Notice of Allowance for Japanese Patent Application No. 2017-162667 dated Jun. 18, 2019.
Chinese Office Action for Chinese Patent Application No. 201810957440.4 dated Sep. 1, 2020.

* cited by examiner

0: NORMAL
1: ABNORMAL

| NO | STEERING ANGLE SENSOR | TORQUE SENSOR | TOUCH SENSOR | SET VEHICLE CONTROL MODE |
|---|---|---|---|---|
| (1) | 0 | 0 | 0 | STRAIGHT + CURVE (HIGH SPEED + INTERMEDIATE SPEED + LOW SPEED) |
| (2) | 0 | 0 | 1 | ONLY STRAIGHT CONTROL (HIGH SPEED + INTERMEDIATE SPEED) |
| (3) | 0 | 1 | 0 | ONLY STRAIGHT CONTROL (LOW SPEED) |
| (4) | 0 | 1 | 1 | ABNORMAL STOP |
| (5) | 1 | 0 | 0 | STRAIGHT + CURVE (HIGH SPEED + INTERMEDIATE SPEED + LOW SPEED) |
| (6) | 1 | 0 | 1 | ONLY STRAIGHT CONTROL (HIGH SPEED + INTERMEDIATE SPEED) |
| (7) | 1 | 1 | 0 | ABNORMAL STOP |
| (8) | 1 | 1 | 1 | ABNORMAL STOP |

DRIVING SUPPORT DEVICE, DRIVING SUPPORT METHOD, AND COMPUTER READABLE STORAGE MEDIUM

CROSS-REFERENCE TO RELATED APPLICATION

Priority is claimed on Japanese Patent Application No. 2017-162667, filed Aug. 25, 2017, the content of which is incorporated herein by reference.

BACKGROUND OF THE INVENTION

Field of the Invention

The present invention relates to a driving support device, a driving support method, and a computer readable storage medium.

Description of Related Art

Conventionally, control devices are known having a lane-keeping assistance system (LKAS) function for supporting a vehicle running near the center of a lane on a road in a running direction of the vehicle (for example, Japanese Unexamined Patent Application, First Publication No. 2007-168720). Such a control device stops the LKAS function by stopping an output of an assisting torque for an electronic power steering (EPS) control device when a reduction in a driver's driving awareness is recognized on the basis of an output of a torque sensor.

SUMMARY OF THE INVENTION

However, the control device described above uniformly stops the output of the assisting torque regardless of states of other sensors, and accordingly, there are cases in which the continuity of driving support is degraded, thus inconveniencing a user.

An aspect of the present invention is in view of such situations, and one object thereof is to provide a driving support device, a driving support method, and a computer readable storage medium capable of improving the continuity of driving support within a possible range.

A driving support device, a driving support method, and a computer readable storage medium according to the present invention employ the following configurations.

(1) According to one aspect of the present invention, a driving support device is provided, including: a plurality of sensors is configured to detect state quantities relating to steering of a vehicle; a determiner is configured to determine whether each of the plurality of sensors is normal or abnormal; and a controller is configured to control execution of driving support functions for supporting a driving operation for the vehicle, wherein the controller determines a control state of an executable driving support function on the basis of a result of the determination of the determiner.

(2) In the aspect (1), in a case in which at least one or more sensors among the plurality of sensors are determined as being abnormal by the determiner, the controller sets the control state of the driving support function as a state limited more than that when a normal time is determined on the basis of the result of the determination of the determiner.

(3) In the aspect (1) or (2), the controller determines the control state of the executable driving support function on the basis of types of the sensors determined as being normal or abnormal by the determiner.

(4) In one of the aspects (1) to (3), the plurality of the sensors include a steering angle sensor is configured to detect a steering angle of the vehicle, a steering torque sensor is configured to detect a steering torque of the vehicle, and a touch sensor is configured to detect a contact state or a gripping state of driver's hands for a steering wheel of the vehicle.

(5) In the aspect (4), in a case in which the steering angle sensor and the touch sensor are determined as being normal by the determiner, and the steering torque sensor is determined as being abnormal, the controller limits lane-keeping control (control by a lane-keeping assistance system) in which a speed of the vehicle is equal to or higher than a first speed and allows lane-keeping control in which the speed is lower than the first speed to be executable.

(6) In the aspect (4), in a case in which the steering angle sensor and the steering torque sensor are determined as being normal by the determiner, and the touch sensor is determined as being abnormal, the controller allows lane-keeping control in which the speed of the vehicle is equal to or higher than a second speed to be executable and limits lane-keeping control in which the speed is lower than the second speed. The "second speed" may be a speed that is the same as or different from the "first speed."

(7) In the aspect (4), in a case in which only the steering torque sensor or only the touch sensor is determined as being abnormal by the determiner, the controller allows lane-keeping control to be executable in an approximately straight running state of the vehicle.

(8) In the aspect (4), in a case in which the steering torque sensor and the touch sensor are determined as being normal by the determiner, and the steering angle sensor is determined as being abnormal, the controller does not limit the executable driving support function.

(9) A driving support method using a computer is provided, including: determining whether each of a plurality of sensors is configured to detect state quantities relating to steering of a vehicle is normal or abnormal; controlling execution of driving support functions for supporting a driving operation of a driver of the vehicle; and determining a control state of an executable driving support function on the basis of a result of the determination.

(10) A non-transitory computer-readable storage medium that stores a computer program to be executed by a computer: determine whether each of a plurality of sensors is configured to detect state quantities relating to steering of a vehicle is normal or abnormal; control execution of driving support functions for a driving operation of a driver of the vehicle; and determine a control state of an executable driving support function on the basis of a result of the determination.

According to the aspects (1) to (10) described above, the continuity of driving support can be improved within a possible range. As a result, a user's convenience can be improved.

DETAILED DESCRIPTION OF THE INVENTION

Hereinafter, a driving support device, a driving support method, and a computer readable storage medium according to an embodiment of the present invention will be described with reference to the drawings.

[Entire Configuration]

Figure 1:
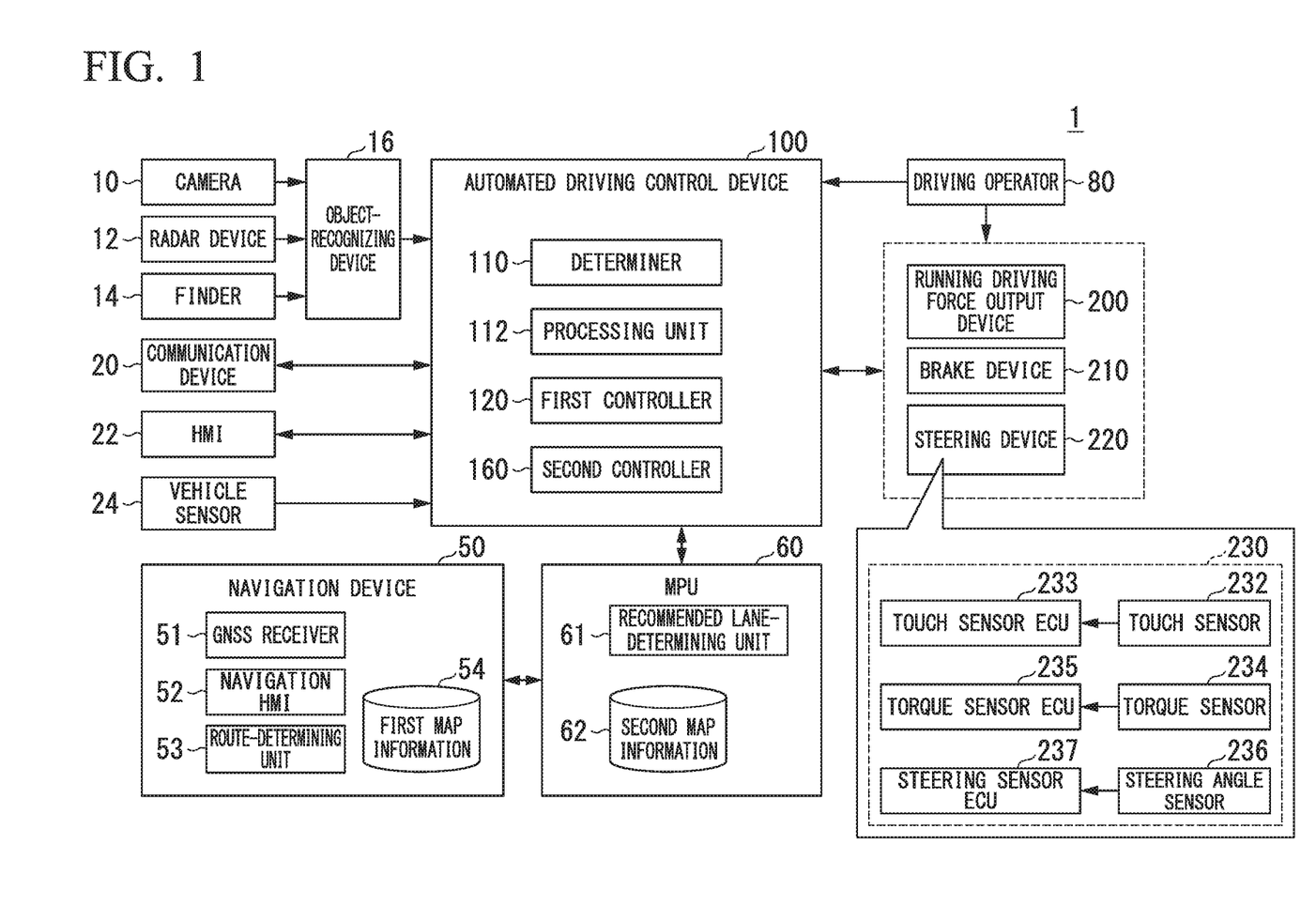
FIG. 1 is a diagram showing of a vehicle system using a driving support device according to an embodiment.

FIG. 1 is a configuration diagram of a vehicle system 1 using a driving support device according to an embodiment. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. In a case in which an electric motor is included, the electric motor operates using power generated using a power generator connected to an internal combustion engine or discharge power of a secondary cell or a fuel cell.

The vehicle system 1, for example, includes a camera 10, a radar device 12, a finder 14, an object-recognizing device 16, a communication device 20, a human machine interface (HMI) 22, a vehicle sensor 24, an information-acquiring unit 30, a navigation device 50, a map positioning unit (MPU) 60, a driving operator 80, an automated driving control device 100, a running driving force output device 200, a brake device 210, and a steering device 220. Such devices and units are interconnected using a multiplex communication line such as a controller area network (CAN) communication line, a serial communication line, a radio communication network, or the like. The configuration shown in FIG. 1 is merely one example, and thus, a part of the configuration may be omitted, and, furthermore, another configuration may be added thereto.

The camera 10, for example, is a digital camera using a solid-state imaging device such as a charge-coupled device (CCD) or a complementary metal-oxide semiconductor (CMOS). One or a plurality of cameras 10 are installed at arbitrary places on a vehicle (hereinafter, referred to as a subject vehicle M) in which the vehicle system 1 is mounted. In a case in which the side in front is to be imaged, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radiowaves such as millimeter waves to the vicinity of the subject vehicle M and detects at least a position (a distance and an azimuth) of an object by detecting radiowaves (reflected waves) reflected by the object. One or a plurality of radar devices 12 are installed at arbitrary places on the subject vehicle M. The radar device 12 may detect a position and a speed of an object using a frequency-modulated continuous wave (FM-CW) system.

The finder 14 is a light detection and ranging (LIDAR) device. The finder 14 emits light to the vicinity of the subject vehicle M and measures scattered light. The finder 14 detects a distance to a target on the basis of a time from light emission to light reception. The emitted light, for example, is laser light having a pulse form. One or a plurality of finders 14 are installed at arbitrary places on the subject vehicle M.

The object-recognizing device 16 may perform a sensor fusion process on results of detection using some or all of the camera 10, the radar device 12, and the finder 14, thereby allowing recognition of a position, a type, a speed, and the like of an object. The object-recognizing device 16 outputs a result of recognition to the automated driving control device 100. In addition, the object-recognizing device 16, as is necessary, may output results of detection using the camera 10, the radar device 12, and the finder 14 to the automated driving control device 100 as they are.

The communication device 20, for example, communicates with other vehicles present in the vicinity of the subject vehicle M using a cellular network, a Wi-Fi network, Bluetooth (registered trademark), dedicated short-range communication (DSRC), or the like or communicates with various server apparatuses through a radio base station.

The HMI 22 presents various types of information to an occupant of the subject vehicle M and receives an input operation performed by a vehicle occupant. The HMI 22 may include various display devices, a speaker, a buzzer, a touch panel, switches, keys, and the like.

The vehicle sensor 24 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, and the like.

The navigation device 50, for example, includes a global navigation satellite system (GNSS) receiver 51, a navigation HMI 52, and a route-determining unit 53 and stores first map information 54 in a storage device such as a hard disk drive (HDD) or a flash memory. The GNSS receiver 51 identifies a position of a subject vehicle M on the basis of signals received from GNSS satellites. The position of the subject vehicle M may be identified or complemented by an inertial navigation system (INS) using an output of the vehicle sensor 24. The navigation HMI 52 includes a display device, a speaker, a touch panel, a key, and the like. A part or the whole of the navigation HMI 52 and the HMI 22 described above may be configured to be shared. The route-determining unit 53, for example, determines a route from a location of the subject vehicle M identified by the GNSS receiver 51 (or an input arbitrary location) to a destination input by a vehicle occupant using the navigation HMI 52 (hereinafter, referred to as a route on a map) by referring to the first map information 54. The first map information 54, for example, is information in which a road form is represented by respective links representing a road and respective nodes connected using the links. The first map information 54 may include a curvature of each road, point of interest (POI) information, and the like. The route on the map determined by the route-determining unit 53 is output to the MPU 60. In addition, the navigation device 50 may perform route guidance using the navigation HMI 52 on the basis of the route on the map determined by the route-determining unit 53. The navigation device 50, for example, may be realized by a function of a terminal device such as a smartphone or a tablet terminal held by a vehicle occupant. In addition, the navigation device 50 may transmit a current location and a destination to a navigation server through the communication device 20 and acquire a route on the map received from the navigation server as a reply.

The MPU 60, for example, functions as a recommended lane-determining unit 61 and maintains second map information 62 in a storage device such as a HDD or a flash memory. The recommended lane-determining unit 61 divides a route provided from the navigation device 50 into a plurality of blocks (for example, divides the route into blocks of 100 [m] in the advancement direction of the vehicle) and determines a recommended lane for each block by referring to the second map information 62. The recommended lane-determining unit 61 determines running on a specific lane from the left side. In a case in which a branching place, a merging place, or the like is present in the route, the recommended lane-determining unit 61 determines a recommended lane such that the subject vehicle M can run on a reasonable route for advancement to divergent destinations.

The second map information 62 is map information having an accuracy higher than that of the first map information 54. The second map information 62, for example, includes information of the center of respective lanes, information on boundaries between lanes, or the like. In addition, in the second map information 62, road information, traffic regulations information, address information (address and zip code), facilities information, telephone information, and the like may be included. By accessing another device using the communication device 20, the second map information 62 may be updated as needed.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of the detection is output to the automated driving control device 100 or one or two of the running driving force output device 200, the brake device 210, and the steering device 220.

The automated driving control device 100, for example, includes a determiner 110, a processing unit 112, a first controller 120, and a second controller 160. Each of the determiner 110, the processing unit 112, the first controller 120, and second controller 160, for example, is realized by a hardware processor such as a central processing unit (CPU) executing a program (software). In addition, some or all of such constituent elements may be realized by hardware (a circuit unit; including circuitry) such as a large-scale integration (LSI), an application-specific integrated circuit (ASIC), a field-programmable gate array (FPGA), or a graphics processing unit (GPU) or may be realized by incorporation of software and hardware. A program may be stored in a storage device such as a hard disk drive (HDD) or a flash memory in advance or may be stored in a storage medium such as a DVD or a CD-ROM that can be loaded or unloaded and be installed in a storage device by loading the storage medium in a drive device.

The determiner 110 determines whether each of a plurality of sensors to be described later is normal or abnormal. The processing unit 112 defines a type of road (a straight road or a curved road) on the basis of a speed of the subject vehicle M and a radius of the curve of the road. Details of the processes of the determiner 110 and the processing unit 112 will be described later.

Figure 2:
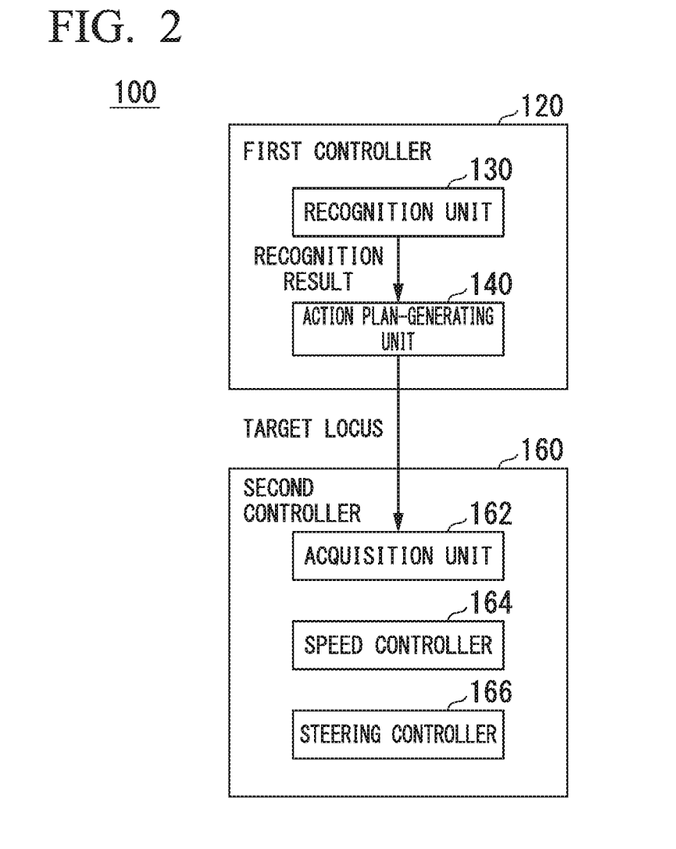
FIG. 2 is a functional configuration diagram of a first controller and a second controller.

FIG. 2 is a functional configuration diagram of the first controller 120 and the second controller 160. The first controller 120, for example, includes a recognition unit 130 and an action plan-generating unit 140. The first controller 120, for example, realizes both functions using artificial intelligence (AI) and functions using a model provided in advance. For example, a function of "recognizing an intersection" may be realized by executing recognition of an intersection using deep learning or the like and recognition based on conditions given in advance (a signal, road markings, and the like that can be used for pattern matching are present) at the same time and comprehensively evaluating by scoring both thereof. Accordingly, the reliability of automated driving is secured.

The recognition unit 130 recognizes states such as a position, a speed, an acceleration, and the like of each object present in the vicinity of the subject vehicle M on the basis of information input from the camera 10, the radar device 12, and the finder 14 through the object-recognizing device 16. The position of an object, for example, is recognized as a position on an absolute coordinate system having a representative point (the center of gravity, the center of a driving shaft, or the like) of the subject vehicle M as its origin and is used for a control process. The position of an object may be represented as a representative point such as the center of gravity or a corner of an object or may be represented as a representative area. A "state" of an object may include an acceleration or a jerk or an "action state" (for example, the object is changing lane or is to change lane) of an object. In addition, the recognition unit 130 recognizes the shape of a curve through which the subject vehicle M will pass subsequently on the basis of a captured image captured by the camera 10. The recognition unit 130 converts the shape of the curve in the captured image captured by the camera 10 into one on an actual plane and, for example, outputs point sequence information or information expressed using a model equivalent thereto to the action plan-generating unit 140 as information representing the shape of the curve.

In addition, the recognition unit 130, for example, recognizes a lane (running lane) in which the subject vehicle M runs. For example, the recognition unit 130 compares a pattern of road partition lines acquired from the second map information 62 (for example, an array of solid lines and broken lines) with a pattern of road partition lines in the vicinity of the subject vehicle M that has been recognized from an image captured by the camera 10, thereby recognizing a running lane. The recognition unit 130 is not limited to recognizing road partition lines and may recognize a running lane by recognizing running lane boundaries (road boundaries) including a road partition line and a road shoulder, curbstones, a median strip, a guardrail, and the like. In the recognition, the position of the subject vehicle M acquired from the navigation device 50 or a result of the process executed by an INS may be additionally taken into account. In addition, the recognition unit 130 may recognize a temporary stop line, an obstacle, a red light, a tollgate, and other road events.

When a running lane is recognized, the recognition unit 130 recognizes a position and a posture of the subject vehicle M with respect to the running lane. The recognition unit 130, for example, may recognize a deviation of a reference point of the subject vehicle M from the center of the lane and an angle of the subject vehicle M with respect to a line extending along the center of the lane in the advancement direction as a relative position and a posture of the subject vehicle M with respect to the running lane. In addition, instead of this, the recognition unit 130 may recognize a position of a reference point on the subject vehicle M with respect to one of side end parts (a road partition line or a road boundary) of the running lane or the like as a relative position of the subject vehicle M with respect to the running lane.

Furthermore, in the recognition process described above, the recognition unit 130 may derive a recognition accuracy and output the derived recognition accuracy to the action plan-generating unit 140 as recognition accuracy information. For example, the recognition unit 130 may generate recognition accuracy information on the basis of a frequency at which a road partition line is recognized over a predetermined time period.

The action plan-generating unit 140 determines events to be sequentially executed in automated driving such that the subject vehicle basically runs on a recommended lane determined by the recommended lane-determining unit 61 and can respond to a surroundings status of the subject vehicle M. As the events, for example, there are a constant-speed running event for running at a constant speed in the same running lane, a following running event of following a vehicle running ahead, an overtaking event of overtaking a vehicle running ahead, an avoidance event of performing braking and/or steering for avoiding approaching an obstacle, a curved running event of running on a curve, a passing through event for passing through a predetermined point such as an intersection, a pedestrian crossing, a railroad crossing, or the like, a lane-change event, a merging event, a branching event, an automated stopping event, a takeover event for ending automated driving and switching to manual driving, and the like.

The action plan-generating unit 140 generates a target locus along which the subject vehicle M is to run in the future in accordance with operating events. Details of each functional unit will be described later. The target locus, for example, includes a speed element. For example, the target locus is represented by sequentially aligning places (locus points) at which the subject vehicle M is to arrive. A locus point is a place at which the subject vehicle M will arrive at respective predetermined running distances (for example, about every several [m]) in length or distance, and separately, a target speed and a target acceleration for each of predetermined sampling times (for example, a fraction of a [sec]) are generated as a part of the target locus. In addition, a locus point may be a position at which the subject vehicle M will arrive at a sampling time for each predetermined sampling time. In such a case, information of a target speed or a target acceleration is represented using intervals between the locus points.

Figure 3:
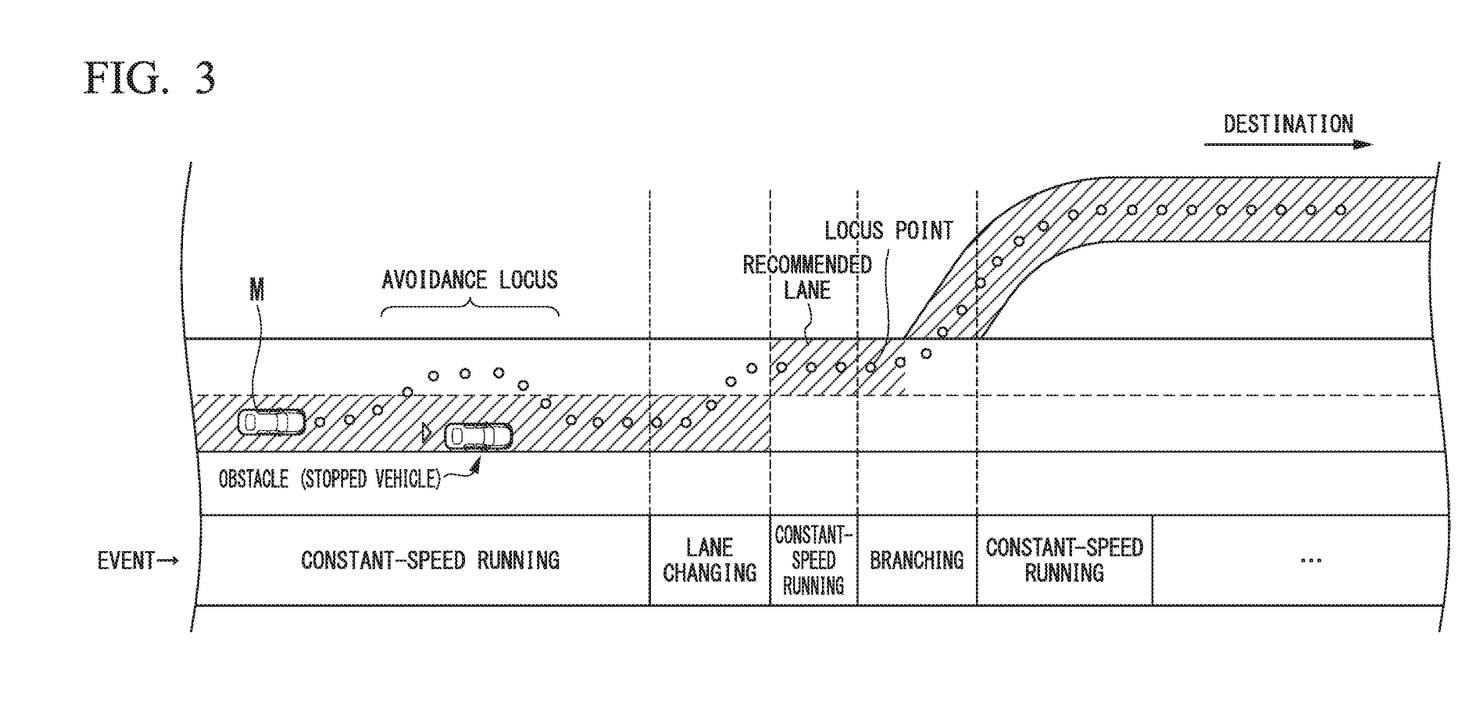
FIG. 3 is a diagram showing a view in which a target locus is generated on the basis of recommended lanes.

FIG. 3 is a diagram showing a view in which a target locus is generated on the basis of recommended lanes. As shown in the drawing, the recommended lanes are set such that surroundings are good for running along a route to a destination. When reaching a predetermined distance before a place at which a recommended lane is changed (may be determined in accordance with a type of event), the action plan-generating unit 140 executes the passing through event, the lane-change event, the branching event, the merging event, or the like. During execution of each event, in a case in which there is a need to avoid an obstacle, an avoidance locus is generated as shown in the drawing.

The second controller 160 performs control of the running driving force output device 200, the brake device 210, and the steering device 220 such that the subject vehicle M passes along a target locus generated by the action plan-generating unit 140 at a planned time.

Referring back to FIG. 2, the second controller 160, for example, includes an acquisition unit 162, a speed controller 164, and a steering controller 166. The acquisition unit 162 acquires information of a target locus (locus point) generated by the action plan-generating unit 140 and stores the target locus in a memory (not shown in the drawing). The speed controller 164 controls the running driving force output device 200 or the brake device 210 on the basis of a speed element accompanying the target locus stored in the memory. The steering controller 166 controls the steering device 220 in accordance with a curved state of the target locus stored in the memory. The processes of the speed controller 164 and the steering controller 166, for example, are realized by a combination of feed-forward control and feedback control. For example, the steering controller 166 may execute feed-forward control according to the curvature of a road in front of the subject vehicle M and feedback control based on a deviation from the target locus.

The running driving force output device 200 outputs a running driving force (torque) used for a vehicle to run to driving wheels. The running driving force output device 200, for example, includes a combination of an internal combustion engine, an electric motor, a transmission, and the like and an ECU controlling these components. The ECU controls the components described above in accordance with information input from the second controller 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second controller 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure to a cylinder by controlling an actuator in accordance with information input from the second controller 160.

The steering device 220, for example, includes an information-processing unit 230, an electric motor, a steering shaft, and the like. The electric motor, for example, changes the direction of the steering wheel by applying a force to a rack and pinion mechanism. The steering device 220 changes the direction of the steering wheel by driving an electric motor in accordance with information input from the second controller 160 or information input from the driving operator 80.

The information-processing unit 230, for example, as shown in FIG. 1 includes a touch sensor 232, a touch sensor ECU 233, a torque sensor 234, a torque sensor ECU 235, a steering angle sensor 236, and a steering sensor ECU 237.

The touch sensor 232 detects a contact state or a gripping state of a driver's hand on a rim part of the steering wheel of the vehicle and outputs a result of the detection to the touch sensor ECU 233. The touch sensor 232, for example, includes a first sensor and a second sensor. The first sensor is disposed in a portion of the steering wheel on the left side (a portion gripped by a driver's left hand) The second sensor is disposed in a portion of the steering wheel on the right side (a portion gripped by a driver's right hand). The first sensor and the second sensor, for example, are antenna electrodes of which electrostatic capacitance (or resistance value) changes in accordance with a distance of a hand or the like to a dielectric or a contact area of a hand or the like.

The touch sensor ECU 233 determines whether or not a driver is gripping the steering wheel on the basis of a degree of change in the electrostatic capacitance detected by the touch sensor 232. For example, in a case in which a degree of change in the electrostatic capacitance detected by the touch sensor 232 is equal to or higher than a reference degree, the touch sensor ECU 233 determines that the driver is gripping the steering wheel.

The touch sensor ECU 233 determines whether there is an abnormality of the touch sensor 232 on the basis of a result of detection output by the touch sensor 232 and, in a case in which the touch sensor 232 is abnormal, outputs information representing an abnormality to the automated driving control device 100. More specifically, in a case in which a result of the detection output by the touch sensor 232 satisfies a predetermined condition, it is determined that the touch sensor 232 is abnormal. Here, the predetermined condition is that a result of the detection exceeds a threshold, the same or equivalent detection results are acquired continuously for a predetermined number of times, or the like.

The torque sensor 234, for example, detects a steering torque working on the steering shaft and outputs a torque signal representing the detected steering torque to the torque sensor ECU 235. The torque sensor ECU 235 derives the magnitude of the steering torque on the basis of a torque signal output by the torque sensor 234 and outputs information representing the derived magnitude of the steering torque to the automated driving control device 100. The torque sensor ECU 235 determines whether there is an abnormality of the torque sensor 234 on the basis of a result of detection output by the torque sensor 234 and, in a case in which the torque sensor 234 is abnormal, outputs information representing the abnormality to the automated driving control device 100.

The steering angle sensor 236 is disposed in a steering shaft, detects a rotation angle of the steering shaft, and outputs a steering angle signal representing the detected rotation angle to the steering sensor ECU 237. The steering sensor ECU 237 derives a rotation angle of the steering shaft on the basis of a steering signal output by the steering angle sensor 236 and outputs information representing the derived rotation angle to the automated driving control device 100. The steering sensor ECU 237 determines whether there is an abnormality of the steering angle sensor 236 on the basis of a result of detection output by the steering angle sensor 236 and, in a case in which the steering angle sensor 236 is abnormal, outputs information representing the abnormality to the automated driving control device 100. The steering sensor ECU 237 and the torque sensor ECU 235 may be integrally configured.

[Flowchart (1)]

Figure 4:
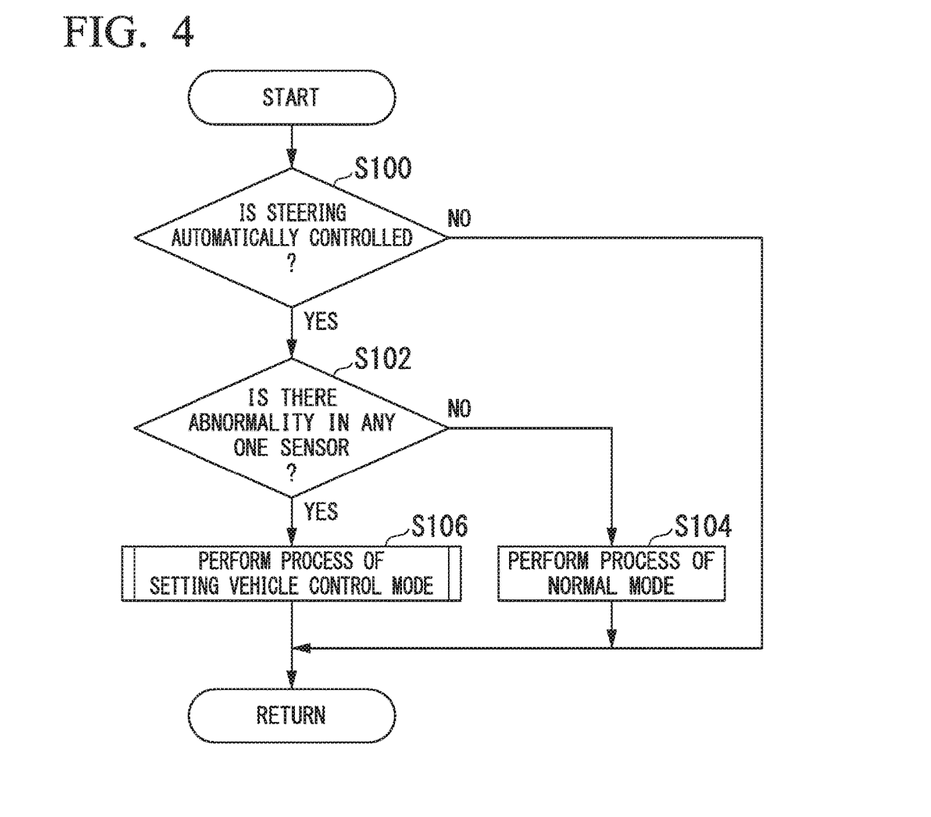
FIG. 4 is a flowchart showing the flow of a process executed by an automated driving control device.

FIG. 4 is a flowchart showing the flow of a process executed by the automated driving control device 100. The automated driving control device 100 executes a plurality of automated driving modes. The plurality of automated driving modes include an automated driving mode executed in a state in which a vehicle occupant grips the steering wheel using the hands and monitors the vicinity of the subject vehicle M, an automated driving mode executed in a state in which a vehicle occupant monitors the vicinity of the subject vehicle M without gripping the steering wheel using the hands, an automated driving mode executed in a state in which a vehicle occupant does not monitor the vicinity of the subject vehicle M without gripping the steering wheel using the hands, and the like. This process, for example, is a process executed when the automated driving control device 100 is set in the automated driving mode executed in a state in which a vehicle occupant grips the steering wheel using the hands and monitors the vicinity of the subject vehicle M in automated driving. The process is a process executed during an event of running to keep the running lane in automated driving.

First, the automated driving control device 100 determines whether or not the steering is automatically controlled (Step S100). The steering being automatically controlled, for example, means that the steering is automatically controlled such that the subject vehicle M runs in the center of a lane in which the subject vehicle M runs. In a case in which the steering is not automatically controlled, the process of Routine 1 of this flowchart ends.

On the other hand, in a case in which the steering is automatically controlled, the determiner 110 determines whether or not there is an abnormality in any one sensor among a plurality of sensors (Step S102). In a case in which there is no abnormality in any sensor, the automated driving control device 100 executes "a process of a normal mode" to be described later (Step S104).

On the other hand, in a case in which there is an abnormality in any one sensor, the automated driving control device 100 executes a "process of setting a vehicle control mode" on the basis of a result of the determination of Step S102 (Step S106). The "process of setting a vehicle control mode" is one example of a process of determining a control state of an executable driving support function. In this case, the automated driving control device 100 transmits a notification requesting to execute a steering operation before a predetermined time has elapsed to a driver using the HMI 22. However, in the process of setting a vehicle control mode, in a case in which a "normal mode" to be described later is set, the process is not limited to such a process (for example, in a case in which there is an abnormality only in the steering angle sensor 236, the "normal mode" is set). Accordingly, the process of Routine 1 of this flowchart ends.

[Vehicle Control Mode]

Figure 5:
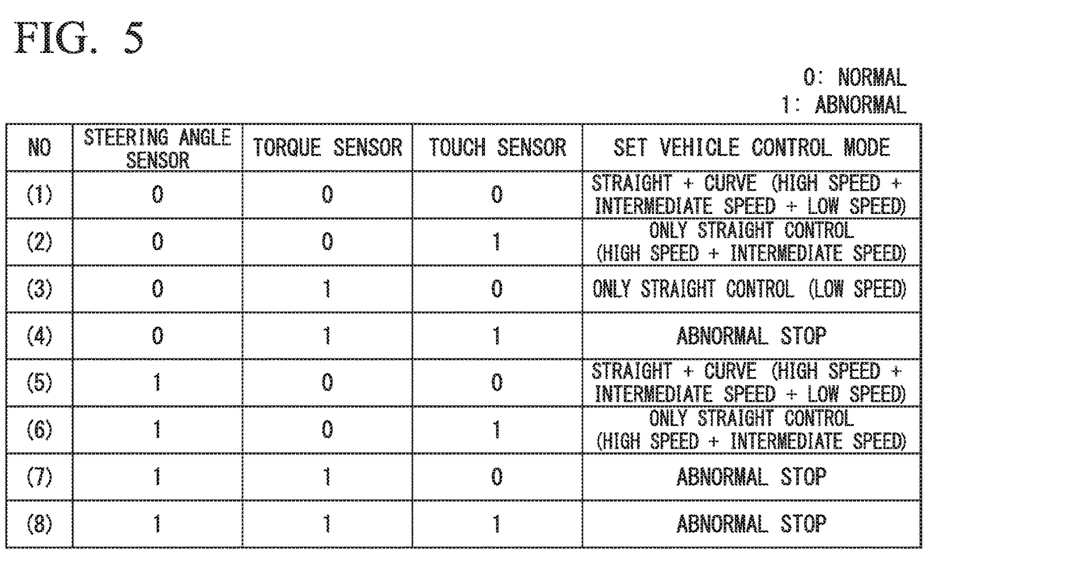
FIG. 5 is a diagram showing control of a vehicle control mode and a state in which there is no abnormality in each sensor.

FIG. 5 is a diagram showing control of a vehicle control mode and a state in which there is no abnormality in each sensor. In the example shown in the drawing, a normal state of a sensor is represented by "0," and an abnormal state thereof is represented by "1."

In the drawing, as shown in (1), in a case in which there is no abnormality in each sensor (in a case in which it is determined that there is no abnormality in each sensor in Step S102) or, as shown in (5), in a case in which there is an abnormality only in the steering angle sensor 236 (in a case in which it is determined that there is an abnormality only in the steering angle sensor 236 in Step S102, and there is an abnormality only in the steering angle sensor 236), the normal mode is set. The normal mode is a mode in which steering is automatically controlled in a case in which the speed of the subject vehicle M is a high speed, an intermediate speed, and a low speed on a straight road and a curved road (details thereof will be described later). In other words, the normal mode is a mode in which a control state of an executable driving support function is not limited. (1) and (2) described above are examples of "when the automated driving control device 100 determines a normal time on the basis of a result of the determination executed by the determiner 110."

Here, although each of the high speed, the intermediate speed, and the low speed may be arbitrarily set, for example, the high speed is equal to or higher than 80 [kilometer per hour (kph)], the intermediate speed is equal to or higher than 60 [kph] and lower than 80 [kph], and the low speed is lower than 60 [kph].

A result of detection using the steering angle sensor 236 has high reliability relating to detection of a steering angle but, compared to results of detection using the other sensors, has relatively low reliability when it is used for determining whether or not a driver is operating the steering wheel. Even in a case in which there is an abnormality in the steering angle sensor 236, it does not have any influence on the determination whether a driver is gripping the steering wheel, and accordingly, control similar to that of a case in which there is no abnormality in each sensor is executed.

In a case in which there is an abnormality in the touch sensor 232 as shown in (2) or in a case there are abnormalities in the steering angle sensor 236 and the touch sensor 232 as shown in (6) in the drawing, on a straight road, the steering is automatically controlled in a case in which the speed of the subject vehicle M is the high speed or the intermediate speed. The reason for this is that it can be determined with high accuracy using a result of detection acquired by the torque sensor 234 whether the driver is gripping the steering wheel in a case in which the speed of the subject vehicle M is the high speed or the intermediate speed on a straight road. On the other hand, the reason for this is that it cannot be determined with high accuracy using a result of detection using the torque sensor 234 whether or not the driver is gripping the steering wheel at the low speed (particularly, during running on an uneven road at the low speed).

Figure 6A:
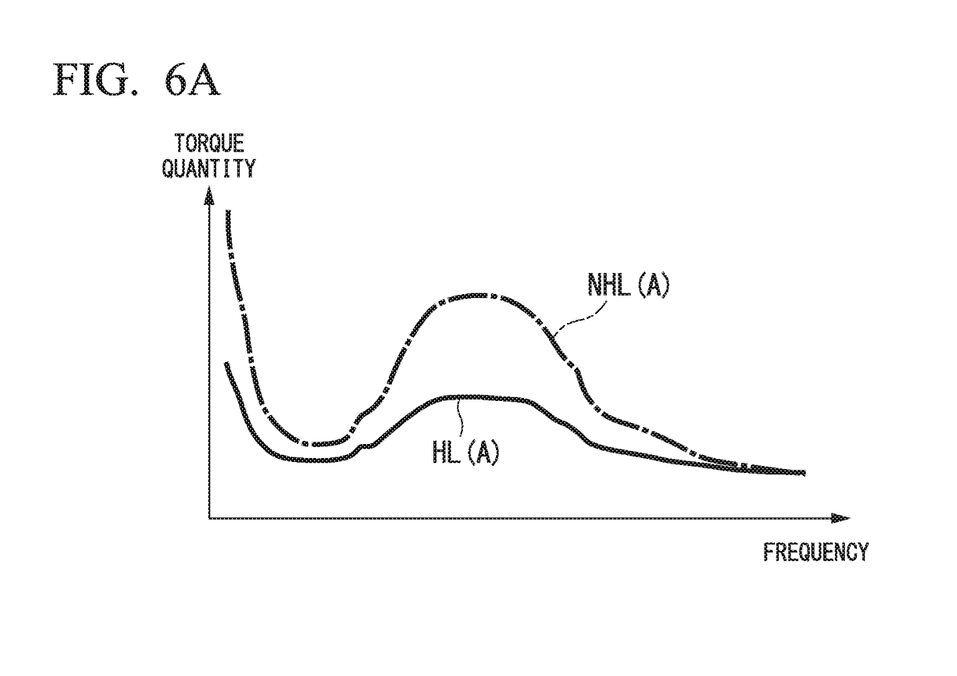
FIG. 6A is a diagram showing a result of detection using a torque sensor.
Figure 6B:
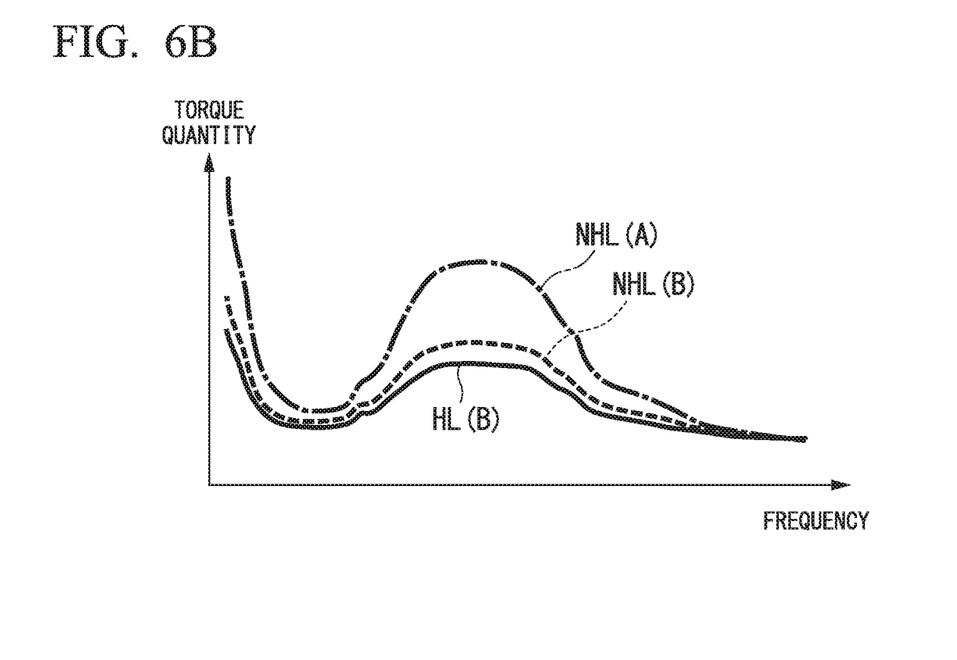
FIG. 6B is a diagram showing a result of detection using a torque sensor.

Hereinafter, the characteristics of the torque sensor 234 will be described. FIGS. 6A and 6B are diagrams showing results of detection using the torque sensor 234. In the drawing, the vertical axis represents the quantity of torque detected by the torque sensor 234, and the horizontal axis represents the frequency. A torque according to a driver's steering operation, other vibration factors, and the like is input to the steering device 220. Here, the other vibration factors, for example, are a vibration input to the steering device 220 in accordance with unevenness of a road or the like, a vibration generated by a driving source, and the like. Components of the input torque are distributed in a predetermined frequency.

FIG. 6A shows a relationship between a frequency and the quantity of torque when the subject vehicle M runs at the intermediate speed or a higher speed, and FIG. 6B shows a relationship between a frequency and the quantity of torque when the subject vehicle M runs at the intermediate speed or a lower speed. A line representing a transition of a frequency and the quantity of torque of a case in which the driver is in the state of gripping the steering wheel will be referred to as a gripping transition line HL, and a line representing a transition of a frequency and the quantity of torque of a case in which the driver is in a state not gripping the steering wheel will be referred to as a non-gripping transition line NHL.

In FIG. 6A, the quantity of torque of the non-gripping transition line NHL(A) is larger than the quantity of torque of the gripping transition line HL(A). Particularly, in a predetermined frequency band, the quantity of torque of the non-gripping transition line NHL(A) is larger than the quantity of torque of the gripping transition line HL(A). Since there is a difference in the quantity of torque as described above, in a case in which an accumulate value of the quantity of torque described above is determined to be a predetermined threshold or more in a case in which the speed of the subject vehicle M is equal to or higher than the middle speed, the determiner 110 determines that the driver is not gripping the steering wheel.

On the other hand, in FIG. 6B, while the quantity of torque of the non-gripping transition line NHL(B) is larger than the quantity of torque of the gripping transition line HL(B), a difference between the quantities of torques of the non-gripping transition line NHL(B) and the gripping transition line HL(B) is smaller than a difference between the qualities of torques of the non-gripping transition line NHL (A) and the gripping transition line HL(A) shown in FIG. 6A. Since the difference between the quantities of torques is small as described above, in a case in which the speed of the subject vehicle M is the low speed, the determiner 110 cannot determine whether or not the driver is gripping the steering wheel with high accuracy.

Since the torque sensor 234 has characteristics as described above, control as shown (2) or (6) shown in FIG. 5 is executed.

The description will be continued by referring back to FIG. 5. As shown in (3) in the drawing, in a case in which there is an abnormality in the torque sensor 234, when the speed of the subject vehicle M is the low speed on a straight road, steering is automatically controlled. The reason for this is that it can be determined with high accuracy whether the driver is gripping the steering wheel on a straight road in a case in which the speed of the subject vehicle M is the low speed in accordance with a result of the detection executed by the touch sensor 232.

Although the touch sensor 232 detects the gripping of the steering wheel regardless of the speed of the subject vehicle M, in order to detect the gripping of the steering wheel more reliably while the vehicle runs at the high speed or the intermediate speed, a condition that the torque sensor 234 is normal is set as a condition for automated steering.

In a case in which there are abnormalities in the torque sensor 234 and the touch sensor 232 as shown in (4) in the drawing, a case in which there are abnormalities in the steering angle sensor 236 and the torque sensor 234 as shown in (7), or a case in which there are abnormalities in the three sensors as shown in (8), the subject vehicle M is controlled to be stopped.

As described above, by determining the control state of the executable driving support function on the basis of the states of the plurality of sensors, the continuity of driving support is increased within a possible range, and the user convenience can be improved. For example, in a case in which a process of automatically controlling the steering is stopped in the automated driving in a case in which there is an abnormality in any one sensor among a plurality of sensors, the user convenience is degraded. Thus, in the automated driving control device 100 according to this embodiment, even in a case in which there is an abnormality in a sensor, executable driving support is executed in accordance with the type of sensor having an abnormality. As a result, the continuity of driving support is increased within a possible range, and the user convenience is improved.

[Curved Road]

Figure 7:
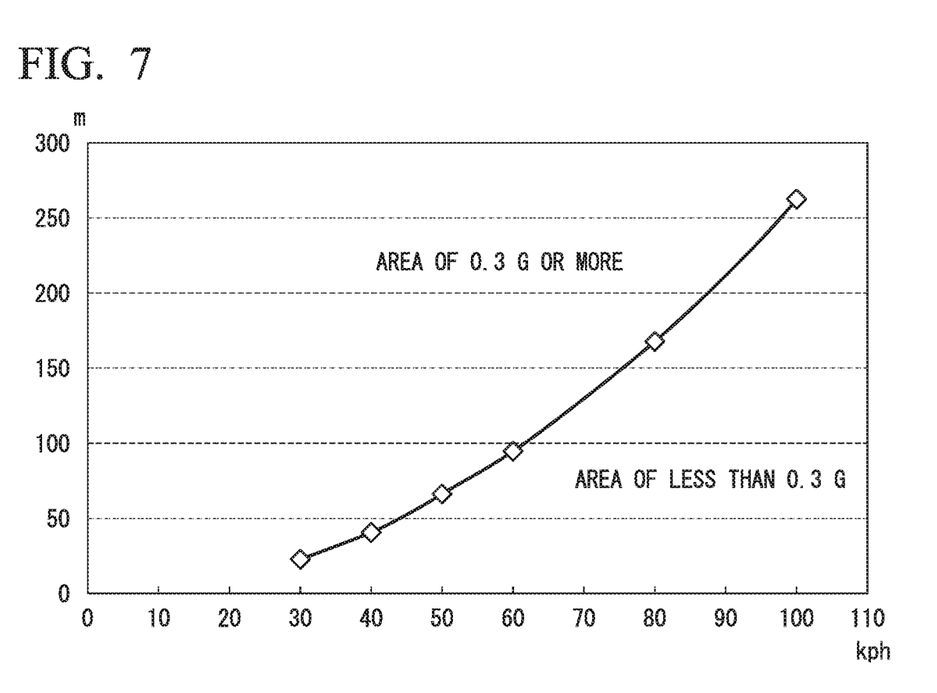
FIG. 7 is a diagram showing a straight road and a curved road.

FIG. 7 is a diagram showing a straight road and a curved road. In a graph shown in FIG. 7, the vertical axis represents a radius of a curve of a road, and the horizontal axis represents speed [kph]. A curved road, for example, is defined on the basis of the speed of the subject vehicle M and the radius of the curve of the road. In other words, it is determined whether a target road is defined as a curved road or a straight road in accordance with the speed of the subject vehicle M. For example, a road in which a centrifugal force is 0.3 G or more in a case in which the subject vehicle M runs thereon is defined as a curved road, and a road in which a centrifugal force G is less than 0.3 G in a case in which the subject vehicle M runs thereon is defined as a straight road. The centrifugal force G, for example, is derived using the following Equation (1). Here, "V" represents a speed (m/s), and "r" represents a radius of a curve.

$$G=V^2/(r9.8) \quad (1)$$

[Flowchart (2)]

Figure 8:
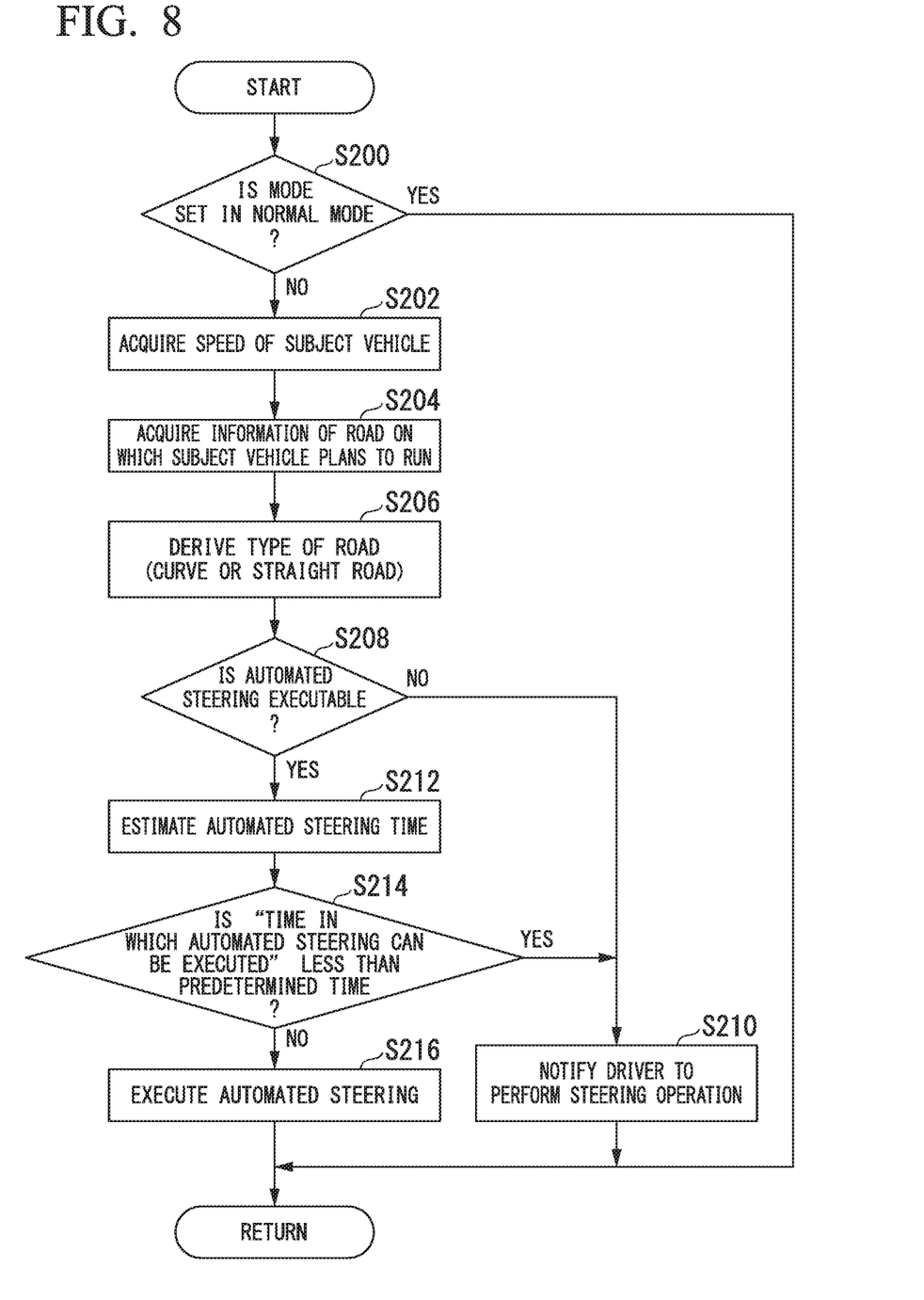
FIG. 8 is another flowchart showing the flow of a process executed by an automated driving control device.

FIG. 8 is another flowchart showing the flow of a process executed by the automated driving control device 100. For example, the process is a process executed in parallel with that of the flowchart shown in FIG. 4. For example, this process is executed at predetermined time intervals.

First, the processing unit 112 determines whether or not a normal mode is set in the process of the flowchart shown in FIG. 4 (Step S200). In a case in which the normal mode is set, the process of Routine 1 of this flowchart ends.

On the other hand, in a case in which the normal mode is not set, the processing unit 112 acquires a speed of the subject vehicle M (Step S202). Next, the processing unit 112 acquires information of a road (for example, a radius of a curve of the road) on which the subject vehicle M runs from the second map information 62 (Step S204).

Next, the processing unit 112 derives a type of road (a curved road or a straight road) on which the subject vehicle M runs on the basis of the speed of the subject vehicle M in the future acquired in Step S202, information of a road acquired in Step S204, and Equation (1) described above (Step S206).

Next, the processing unit 112 determines whether or not automated steering can be executed on the road (Step S208). In a case in which the derived type of road and the speed of the subject vehicle M are within a type of road and a speed set in the vehicle control mode, the processing unit 112 determines that automated steering can be executed. In a case in which the automated steering cannot be executed, the processing unit 112 notifies the driver to perform a steering operation (Step S210). The processing unit 112 performs the notification described above by outputting an audio and an image to the HMI 22.

On the other hand, in a case in which the automated steering can be executed, the processing unit 112 estimates a time in which automated steering can be executed on a road on which the subject vehicle M is to run in the future (Step S212). Automated steering being executable means that an automated operation can be executed without intervention of a driver's steering operation. For example, the processing unit 112 derives a type of road on which the subject vehicle M is to run in the future on the basis of the shape of a road (a radius of a curve) on which the subject vehicle M is to run in the future, the speed of the subject vehicle M in the future, Equation (1) described above, and the like. In a case in which the derived type of road and the speed of the subject vehicle M in the future are determined to be within the type of road and a speed range set in the vehicle control mode, the processing unit 112 determines that the subject vehicle M can run through automated steering on a road on which the subject vehicle M is to run in the future. The processing unit 112 estimates a time in which automated steering can be executed by repeating the process described above.

The processing unit 112 determines whether or not a time in which the automated steering can be executed is a less than a predetermined time (Step S214). In a case in which the time in which the automated steering can be executed is less than the predetermined time, the process proceeds to the process of Step S210.

On the other hand, in a case in which the time in which the automated steering can be executed is not less than the predetermined time (a case in which the time is the predetermined time or more), the processing unit 112 executes the automated steering (Step S216). In this way, the process of Routine 1 of this flowchart ends.

According to the process described above, a control state of the executable driving support function can be determined on the basis of the type of road, and accordingly, the continuity of the driving support is increased within a possible range, and the user convenience can be further improved. In addition, frequent switching between automated steering and the steering operation can be prevented. As a result, the user convenience is further improved.

According to the embodiment described above, a plurality of the sensors 232, 234, and 236 detecting the amounts of changes of different targets for the steering of a vehicle, the determiner 110 determining whether or not each of the plurality of the sensors is normal or abnormal, and the controller 120 controlling the execution of a driving support function for a driving operation of a driver of the vehicle are included. By determining a control state of an executable driving support function on the basis of a result of the determination executed by the determiner 110, the controller 120 increases the continuity of driving support within a possible range, and the user convenience can be further improved.

In the embodiment described above, although the information-acquiring unit 30, the determiner 110, the processing unit 112, and a functional unit determining a control state of the driving support function have been described as being applied to an automated driving vehicle, such functional configurations may be mounted in a vehicle in which the driving support device is mounted. The driving support device, for example, includes a recognition-processing unit and a steering support controller. The steering support controller controls the steering device 220 such that the subject vehicle M is close to the center of its own lane recognized by the recognition-processing unit.

In the example described above, although the touch sensor 232 and the touch sensor ECU 233 have been described as being used, instead of (or in addition to) this, a camera and an image-recognizing unit may be included. The camera captures an image of an area including a driver and a steering wheel inside the interior as its center. The image-recognizing unit analyzes an image captured by the camera, determines whether or not a driver is gripping the steering wheel using a technique such as pattern matching or the like, and outputs a result of the determination to the automated driving control device 100.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving support device, comprising:
   a plurality of sensors configured to detect state quantities relating to steering of a vehicle;
   a determiner configured to determine whether each of the plurality of sensors is normal or abnormal; and a controller configured to control execution of driving support functions for supporting a driving operation for the vehicle,
wherein the controller is configured to determine at least one executable control mode from among a plurality of control modes in the driving support functions based on a determination result of the determiner, and control execution of a driving support function of the driving support functions based on the at least one executable control mode, wherein each of the plurality of control modes defines a condition including an allowable speed and an allowable road shape.

2. The driving support device according to claim 1, wherein, in a case in which at least one or more sensors among the plurality of sensors are determined as being abnormal by the determiner, the controller sets the control state of the driving support function as a state limited more than that when a normal time is determined based on the result of the determination of the determiner.

3. The driving support device according to claim 2, wherein the controller determines the control state of the executable driving support function based on types of the sensors determined as being normal or abnormal by the determiner.

4. The driving support device according to claim 3, wherein the plurality of the sensors include a steering angle sensor is configured to detect a steering angle of the vehicle, a steering torque sensor is configured to detect a steering torque of the vehicle, and a touch sensor is configured to detect a contact state or a gripping state of driver's hands for a steering wheel of the vehicle.

5. The driving support device according to claim 4, wherein, in a case in which the steering angle sensor and the touch sensor are determined as being normal by the determiner, and the steering torque sensor is determined as being abnormal, the controller limits lane-keeping control in which a speed of the vehicle is equal to or higher than a first speed and allows lane-keeping control in which the speed is lower than the first speed to be executable.

6. The driving support device according to claim 4, wherein, in a case in which the steering angle sensor and the steering torque sensor are determined as being normal by the determiner, and the touch sensor is determined as being abnormal, the controller allows lane-keeping control in which the speed of the vehicle is equal to or higher than a second speed to be executable and limits lane-keeping control in which the speed is lower than the second speed.

7. The driving support device according to claim 4, wherein, in a case in which only the steering torque sensor or only the touch sensor is determined as being abnormal by the determiner, the controller allows lane-keeping control to be executable in an approximately straight running state of the vehicle.

8. The driving support device according to claim 4, wherein, in a case in which the steering torque sensor and the touch sensor are determined as being normal by the determiner, and the steering angle sensor is determined as being abnormal, the controller does not limit the executable driving support function.

9. A driving support method using a computer, the driving support method comprising:
determining whether each of a plurality of sensors is configured to detect state quantities relating to steering of a vehicle is normal or abnormal;
controlling execution of driving support functions for supporting a driving operation of a driver of the vehicle; and
determining at least one executable control mode from among a plurality of control modes in the driving support functions based on a result of determining whether each of the plurality of sensors is configured to detect state quantities, and controlling execution of a driving support function of the driving support functions based on determining the at least one executable control mode, wherein each of the plurality of control modes defines a condition including an allowable speed and an allowable road shape.

10. A non-transitory computer-readable storage medium that stores a computer program to be executed by a computer to perform at least:
determine whether each of a plurality of sensors is configured to detect state quantities relating to steering of a vehicle is normal or abnormal;
control execution of driving support functions for a driving operation of a driver of the vehicle; and
determine at least one executable control mode from among a plurality of control modes in the driving support functions based on a result of determining whether each of the plurality of sensors is configured to detect state quantities, and control execution of a driving support function of the driving support functions based on determining the at least one executable control mode, wherein each of the plurality of control modes defines a condition including an allowable speed and an allowable road shape.

* * * * *